(12) United States Patent
Rustomji et al.

(10) Patent No.: US 11,049,668 B2
(45) Date of Patent: Jun. 29, 2021

(54) ELECTROLYTE FOR ELECTROCHEMICAL CAPACITOR

(71) Applicant: SOUTH 8 TECHNOLOGIES, INC., San Diego, CA (US)

(72) Inventors: Cyrus Sam Rustomji, La Jolla, CA (US); Jungwoo Lee, San Diego, CA (US); James Royer, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 17/006,851

(22) Filed: Aug. 30, 2020

(65) Prior Publication Data

US 2021/0098204 A1    Apr. 1, 2021

Related U.S. Application Data

(60) Provisional application No. 62/911,505, filed on Oct. 7, 2019, provisional application No. 62/908,515, filed on Sep. 30, 2019, provisional application No. 62/911,508, filed on Oct. 7, 2019.

(51) Int. Cl.
| | |
|---|---|
| *H01G 11/60* | (2013.01) |
| *H01G 11/62* | (2013.01) |
| *H01G 11/32* | (2013.01) |
| *H01G 11/46* | (2013.01) |
| *H01G 11/64* | (2013.01) |
| *H01M 4/38* | (2006.01) |
| *H01M 4/505* | (2010.01) |
| *H01M 4/525* | (2010.01) |
| *H01M 10/04* | (2006.01) |
| *H01M 10/0567* | (2010.01) |

(Continued)

(52) U.S. Cl.
CPC ............ *H01G 11/60* (2013.01); *H01G 11/32* (2013.01); *H01G 11/46* (2013.01); *H01G 11/62* (2013.01); *H01G 11/64* (2013.01); *H01M 4/382* (2013.01); *H01M 4/505* (2013.01); *H01M 4/525* (2013.01); *H01M 10/0422* (2013.01); *H01M 10/0567* (2013.01); *H01M 10/0568* (2013.01); *H01M 10/0569* (2013.01); *H01M 2300/0034* (2013.01)

(58) Field of Classification Search
CPC ......... H01G 11/60; H01G 11/62; H01G 11/32
See application file for complete search history.

(56) References Cited

U.S. PATENT DOCUMENTS

| | | | |
|---|---|---|---|
| 2016/0261005 A1* | 9/2016 | Rustomji | ............... H01G 11/60 |
| 2017/0125175 A1 | 5/2017 | Kim et al. | |
| 2018/0068803 A1* | 3/2018 | Brambilla | ............... H01G 11/56 |

(Continued)

OTHER PUBLICATIONS

International Search Report dated Nov. 13, 2020 for PCT/us2020/048661.

*Primary Examiner* — David M Sinclair
(74) *Attorney, Agent, or Firm* — Manuel de la Cerra (57) ABSTRACT

Novel electrolytes, and techniques for making and devices using such electrolytes, which are based on compressed gas solvents are disclosed. Unlike conventional electrolytes, the disclosed electrolytes are based on "compressed gas solvents" mixed with various salts, referred to as "compressed gas electrolytes." Various combinations of salt and solvents are disclosed to increase performance of electrochemical capacitors using liquefied gas electrolytes.

2 Claims, 9 Drawing Sheets

(51) Int. Cl.
*H01M 10/0568* (2010.01)
*H01M 10/0569* (2010.01)

(56) References Cited

U.S. PATENT DOCUMENTS

| | | | | |
|---|---|---|---|---|
| 2018/0375156 A1* | 12/2018 | Zhamu | .................. | H01M 4/134 |
| 2020/0067032 A1* | 2/2020 | Davies | .................. | H01M 2/345 |
| 2020/0266007 A1* | 8/2020 | Rustomji | ............... | H01G 11/62 |

* cited by examiner

ELECTROLYTE FOR ELECTROCHEMICAL CAPACITOR

1.0 CROSS-REFERENCE TO RELATED APPLICATIONS

The present application claims priority to U.S. Provisional Application 62/908,515 filed Sep. 30, 2019, to U.S. Provisional Application 62/911,505 filed Oct. 7, 2019, and to U.S. Provisional Application 62/911,508 filed Oct. 7, 2019. Each of these applications is incorporated by reference in their entirety.

This application is also related to U.S. application Ser. No. 16/666,155 filed Oct. 28, 2019, to PCT/US2019/032413 filed May 15, 2019, to U.S. Provisional Application No. 62/673,792 filed May 18, 2018, to U.S. application Ser. No. 16/666,131 filed Oct. 28, 2019, to PCT/US2019/032414 filed May 15, 2019, to U.S. Provisional Application No. 62/673,752 filed May 18, 2019, to U.S. Provisional Application No. 62/749,046 filed Oct. 22, 2018, to U.S. Provisional Application No. 61/972,101 filed Mar. 28, 2014, to U.S. Provisional Application No. 61/905,057 filed Nov. 15, 2013, to PCT/US14/066015 filed Nov. 17, 2014, to U.S. application Ser. No. 15/036,763 filed May 13, 2016, to U.S. application Ser. No. 16/793,190 filed Feb. 18, 2020, to PCT/US17/29821 filed Apr. 27, 2017, to U.S. application Ser. No. 16/305,034 filed Nov. 28, 2018, to U.S. Provisional Application No. 62/342,838 filed May 27, 2016, to PCT/US2020/026086 filed Apr. 1, 2020, and to U.S. Provisional Application No. 62/800,955 filed Feb. 4, 2019. The contents of each of these applications are hereby incorporated by reference in their entirety.

2.0 STATEMENT REGARDING FEDERALLY SPONSORED R&D

None

3.0 FIELD OF THE INVENTION

Embodiments of the invention relate to compositions and chemical formulations of electrolytes for use in electrochemical energy devices, such as batteries and electrochemical capacitors. Devices using the compositions and methods of use of the compositions are also provided.

4.0 BACKGROUND

Electrochemical energy storage devices, such as batteries and double layer capacitors, utilize an ionically conducting electrolyte solution to carry charge between positive and negative electrodes. Typically, these electrolytes are liquid at a standard room temperature of +20° C. and at a standard pressure (approximately 1.01325 bar). The electrolyte solutions use a mixture of some amount of solvent, salt and additional components.

Electrochemical energy storage devices, such as electrochemical capacitors, suffer from performance degradation at high voltages and high temperatures. Undesirable decomposition occurs with unstable electrolyte solvents or salts, which degrades device performance when under high voltage or high temperature. Typically, a common electrolyte, such as 1.0 M TEABF4 in acetonitrile solvent, will be limited to −40 to +65° C. and 2.7 V. Reaching lower temperatures of −60° C. and temperatures as high as +85° C. or voltages higher than 3.0 V without degradation is highly desirable. To do so requires advancements in electrolyte solvent and salt formulations.

5.0 SUMMARY

Embodiments of the present disclosure relate to chemical formulations, electrolyte compositions, electrochemical capacitors of use thereof, and methods of use thereof. Some disclosed embodiments relate to novel formulations for electrolytes comprising a liquefied gas solvent. Disclosed herein are electrolyte formulations for electrochemical capacitors that improve the low-temperature, high-temperature, and high-voltage performance of cells.

One embodiment relates to a electrochemical capacitor that includes: an ionically conducting electrolyte comprising one or more liquefied gas solvents and one or more salts; a housing enclosing the ionically conducting electrolyte and being structured to provide a pressurized condition to the liquefied gas solvent; and at least two conducting electrodes in contact with the ionically conducting electrolyte.

In some embodiments, the liquefied gas solvent is capable of being placed under a compressive pressure equal to, or greater than, the liquefied gas solvent's vapor pressure at a temperature when the compressive pressure is applied, thereby keeping the liquefied gas solvent in a liquid phase. In some embodiments, the liquefied gas solvent has a vapor pressure above an atmospheric pressure of 100 kPa at a room temperature of 293.15 K. Embodiments of the present disclosure relate to chemical formulations, electrolyte compositions, electrochemical devices using thereof, and methods of use thereof. Some disclosed embodiments relate to novel formulations for electrolytes comprising a liquefied gas solvent.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents, as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

It is preferred to increase the voltage and capacity of electrochemical capacitors to maximize the energy stored in the device. In addition, the device must operate over a wide range of temperatures and have good high-power (fast charge or fast discharge) properties. While acetonitrile, an organic liquid, mixed with a TEABF4 (tetraethyl ammonium tetrafluoroborate) salt is most commonly used as an electrolyte for electrochemical capacitors, the device is commonly limited to 2.7 V and −40 to +65° C. temperature operation. Previously disclosed was a novel liquefied gas solvent, difluoromethane, mixed with various salts and shown to operate over a wide temperature range down to −60° C.; however, high temperature was limited to +65° C., and the device did not have good high-power performance due to poor salt solubility and diffusion within the solvent.

Disclosed herein are previously undisclosed salts to be used in combination with liquefied gas electrolytes. Salts such as spiro-(1,1')-bipyrrolidinium or dimethylpyrrolidinium tetrafluoroborate show excellent solubility in liquefied gas electrolytes, notably difluoromethane, of at least 2.0 M as measured in various experiments. It would have been otherwise impossible to determine that the solubility of these salts in liquefied gas electrolytes was considerably higher than that of the common salts without careful experimentation. The unexpectedly high solubility is thought to be due to the unique structure of the cation, which has two ethyl groups joined together to make a highly soluble cation. It is seen that this type of structure on the cation can greatly improve the solubility in difluoromethane and in other liquefied gas solvents. Although the increase in solubility for these salts in traditional liquid solvents has been disclosed before, never has anybody attempted to check the solubility in a liquefied gas electrolyte, as disclosed here. Further, the smaller size and molecular mass of the cation over the size and mass of the common tetraethylammonium cation allow for higher conductivity in the electrolyte and for higher cell capacitance, as they allow access to even smaller nanopores inside the carbon electrode. Using these salts in an electrochemical capacitor device led to unexpectedly high performance over a broad temperature range from −60 to +85° C. with excellent charge and discharge rates and capacity retention. Previous work with common salts, such as tetraethylammonium tetrafluoroborate and tetrabutylammonium tetrafluoroborate, showed poor power performance at low temperatures. This is due to salt precipitation at these low temperatures. In contrast, the unexpectedly high solubility of spiro-(1,1')-bipyrrolidinium tetrafluoroborate or dimethylpyrrolidinium tetrafluoroborate allows for still very good performance at low temperatures. This performance would have impossible to determine without careful experimentation. Further, the cell with spiro-(1,1')-bipyrrolidinium tetrafluoroborate or dimethylpyrrolidinium tetrafluoroborate shows an unexpectedly excellent life under accelerated life testing at 2.7 V and +85° C., which is unattainable in conventional electrochemical capacitors. Although, in conventional liquid-based electrolytes (ex. acetonitrile), these salts have shown improved voltage 3.0 V at +65° C., none have been shown to have the simultaneous capability to operate at 2.7 V at a high temperature of +85 C and maintain high power at a low temperature as low as −60° C. This indicated surprisingly favorable results for the stability of both the salt and the solvent system.

Figure 9:
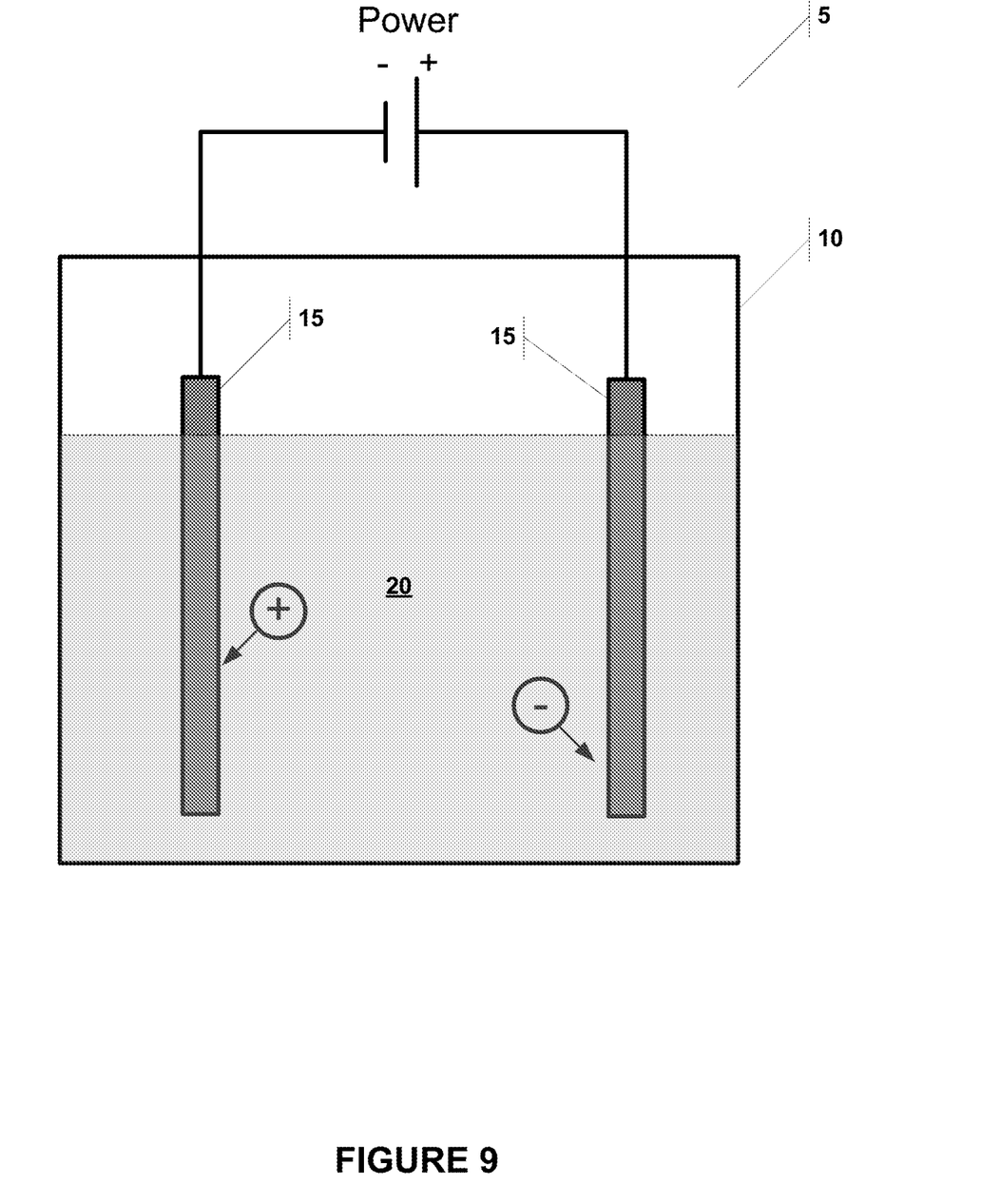
FIG. 9 is an example construction of the electrochemical device described herein.

In one embodiment, the electrochemical energy storage device relates to an electrochemical capacitor. In some embodiments, the electrochemical capacitor 5 may also include a housing 10 that encloses two conducting electrodes 15 and the ionically conducting electrolyte 20, as shown in FIG. 9. In some embodiments, the liquefied gas solvent has a vapor pressure above an atmospheric pressure of 100 kPa at a room temperature of 293.15 K. In some such embodiments, the liquefied gas solvent may be capable of being placed under a compressive pressure equal to, or greater than, the liquefied gas solvent's vapor pressure at a temperature when the compressive pressure is applied, thereby keeping the liquefied gas solvent in a liquid phase.

In some embodiments, one or both of the conducting electrodes can be composed of carbon material such as activated carbon, graphite, carbon black, graphene, carbon nanotubes. Additionally, electrodes may contain binder material such as PVDF, SBR, CMC, PTFE. Electrodes may be coated on current collector material such as aluminum, copper, nickel, titanium. The current collector may be a foil, a mesh, or a foam type material.

In some embodiments, the electrochemical device is an electrochemical energy storage device such as an electrochemical capacitor as described in PCT/US2014/066015, PCT/US2017/29821, PCT/US2019/032414, and PCT/US2019/032413.

In one embodiment, the liquefied gas solvent comprises of difluoromethane. In another embodiment, the liquefied gas solvent comprises fluoromethane. In another embodiment, the liquefied gas solvent comprises 1,1-difluoroethane. In another embodiment, the liquefied gas solvent comprises a mixture of fluoromethane and difluoromethane. In another embodiment, the liquefied gas solvent comprises a mixture of 1,1-difluoroethane and difluoromethane. In another embodiment, the liquefied gas solvent comprises a mixture of fluoromethane and 1,1-difluoroethane. In another embodiment, the liquefied gas solvent comprises a mixture of fluoromethane, difluoromethane, and 1,1-difluoroethane. The ratio of the two component mixed solvent system can be about 99:1, 98:2, 95:5, 90:10, 80:20, 70:30, 60:40, 50:50, 40:60, 30:70, 20:80, 10:90, 5:95, 2:98, 1:99 by weight of any two liquefied gas solvents fluoromethane, difluoromethane, and 1,1-difluoroethane. The ratio of the three-component mixed solvent system can be about 1:1:1, 1:2:2, 1:3:3, 2:1:2, 2:2:1, 1:2:3, 1:3:2, 2:3:2, 1:3:3 for the three liquefied gas solvents fluoromethane, difluoromethane, and 1,1-difluoroethane.

In some embodiments, the one or more salts can be comprised of those with positively charged cations such as tetramethylammonium, tetraethylammonium, tetrapropylammonium, tetrabutylammonium, triethylmethylammonium ammonium, spiro-(1,1')-bipyrrolidinium, 1,1-dimethylpyrrolidinium, and 1,1-diethylpyrrolidinium paired with negatively charged anions such as acetate, bis(fluorosulfonyl)imide, bis(oxalate)borate, bis(trifluoromethanesulfonyl)imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate.

Figure 1:
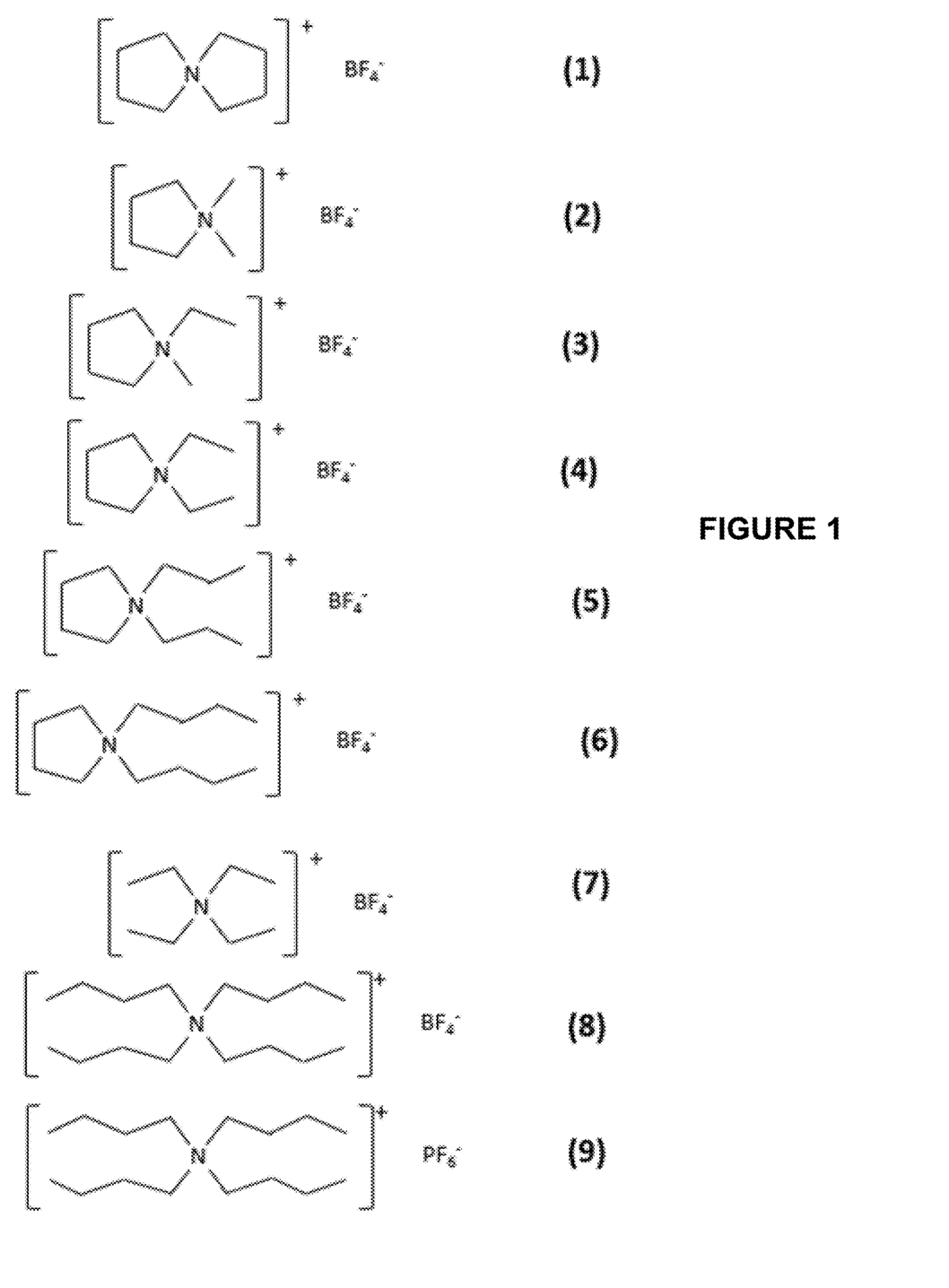
FIG. 1 illustrates the structure of several salts that may be used in the present invention.

In one embodiment, the salt is composed of spiro-(1,1')-bipyrrolidinium tetrafluoroborate (SBPBF4), having the structure (1). In another embodiment, the salt is composed of dimethylpyrrolidinium tetrafluoroborate (DMPBF4), having the structure (2). In another embodiment, the salt is composed of ethylmethylpyrrolidinium tetrafluoroborate (EMPBF4), having the structure (3). In another embodiment, the salt is composed of diethylpyrrolidinium tetrafluoroborate (DEPBF4), having the structure (4). In another embodiment, the salt is composed of dipropylpyrrolidinium tetrafluoroborate (DPPBF4), having the structure (5). In another embodiment, the salt is composed of dibutylpyrrolidinium tetrafluoroborate (DBPBF4), having the structure (6). In another embodiment, the salt is composed of tetraethylammonium tetrafluoroborate (TEABF4), having the structure (7). In another embodiment, the salt is composed of tetrabutylammonium tetrafluoroborate (TBABF4), having the structure (8). In another embodiment, the salt is composed of tetrabutylammonium hexafluorophosphate (TBAPF6), having the structure (9). These nine structures are shown in FIG. 1.

In another embodiment, any of the positively charged cations used in salts (1)-(9) may be used with a plurality of negatively charged anions such as acetate, bis(fluorosulfonyl)imide, bis(oxalate)borate, bis(trifluoromethanesulfonyl)imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate.

The salt in the liquefied gas solvent can be about 0.001, 0.01, 0.1, 0.2, 0.3, 0.4, 0.5, 0.6, 0.7, 0.8, 1.0, 1.1, 1.2, 1.3, 1.4, 1.5, 1.6, 1.7, 1.8, 1.9, 2.0, 2.5, or 3 molar concentration. In another embodiment, the one or more salts can be used at any such concentration to form an electrolyte with a salt mixture. In one embodiment, this could be 0.7 M SBPBF4 and 0.3M TEABF4 in difluoromethane. In another embodiment, this could be 0.5 M SBPBF4 and 0.5 M TBABF4 in difluoromethane. In another embodiment, this could be 0.3 M SBPBF4 and 0.7 M TBAPF6 in difluoromethane. In another embodiment, this could be 1.0 M SBPBF4 in difluoromethane. In another embodiment, this could be 1.0 M TBAPF6 in difluoromethane. In another embodiment, this could be 0.3 M TEABF4 in difluoromethane. In another embodiment, this could be 1.0 M DMPBF4 in difluoromethane.

Alternative or additional embodiments described herein provide an electrolyte composition comprising one or more of the features of the foregoing description or of any description elsewhere herein.

Alternative or additional embodiments described herein provide a device comprising one or more of the features of the foregoing description or of any description elsewhere herein.

Alternative or additional embodiments described herein provide a method of using the electrolyte composition or device comprising one or more of the features of the foregoing description or of any description elsewhere herein.

One of skill in the art will understand that the terms "one or more salts," "one or more solvents" (including "liquefied gas solvents" and "liquid solvents"), and "one or more additives," as used herein in connection with "the ionically conducting electrolytes," can refer to one or to a plurality of electrolyte components.

6.1 Example 1

Figure 2:
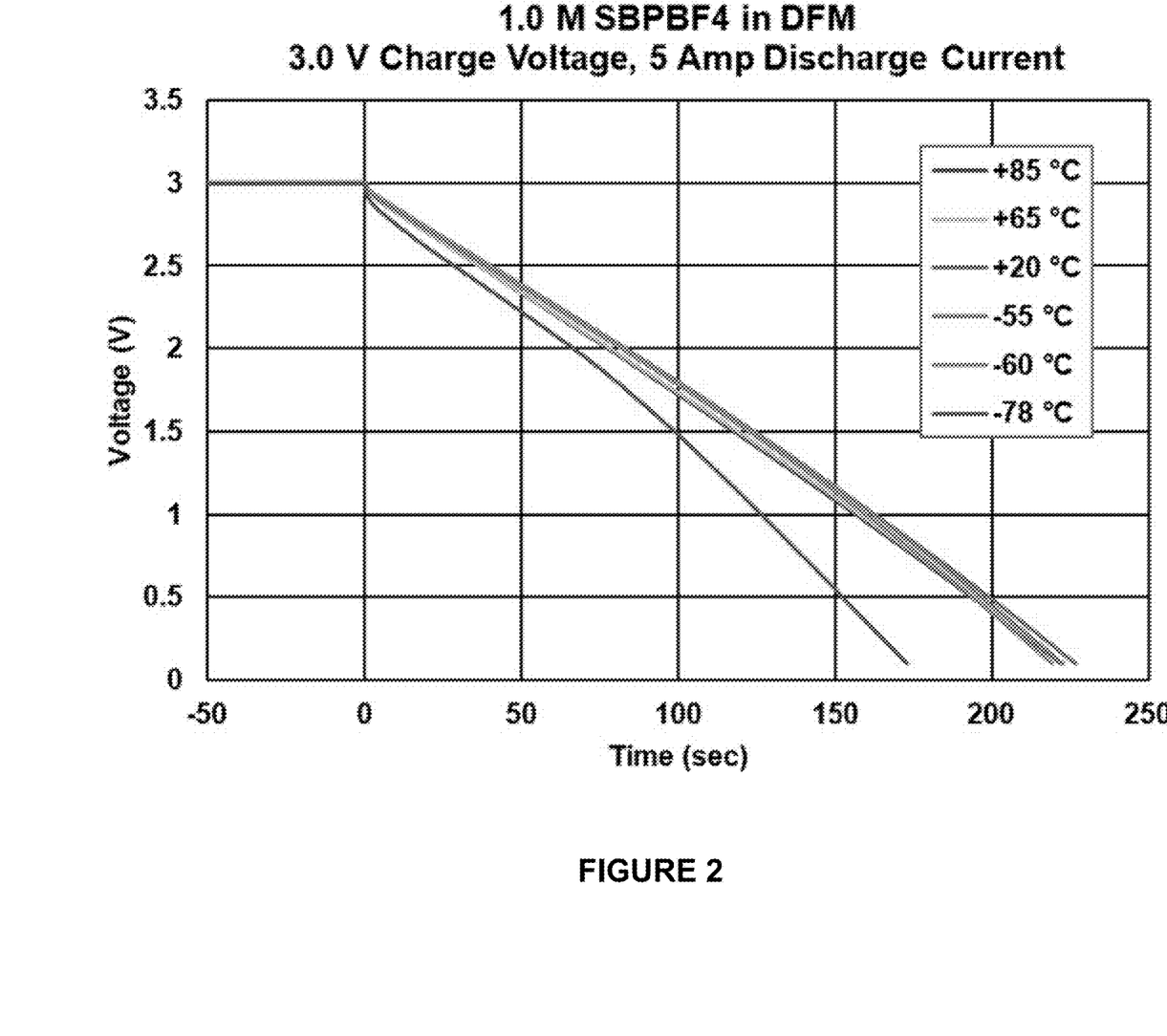
FIG. 2 illustrates the discharge curves at various temperatures for an electrochemical device composed of 1.0 M SBPBF4 in difluoromethane.

An electrochemical capacitor device was tested with a liquefied gas electrolyte composed of 1.0 M SBPBF4 in difluoromethane (DFM). The device was charged to 3.0 V for 60 minutes and was discharged at a rate of 5 A at various temperatures. It performed well from +85° C. to −55° C. with little change in capacitance or impedance over that temperature range. It showed some capacitance loss at lower temperatures of −78° C., yet still showed superior performance at low temperatures when compared to state-of-art electrochemical capacitors. Most surprising is the ability for the capacitor to perform well at 3.0 V and +85° C. for short periods of time. This unexpected performance is superior to that of state-of-art capacitors, which show rapid degradation when held at 3.0 V and +85° C. even for a few minutes or hours. This has applications in areas where short-term high temperature is expected. The performance metrics are described in Table 1 below, and the discharge curves are shown in FIG. 2.

TABLE 1

| 1.0M SBPBF4 in DFM | | |
|---|---|---|
| Temperature (° C.) | DCR (mΩ) | Capacitance (F) |
| +85° C. | 3.18 | 399.9 |
| +65° C. | 3.64 | 408.4 |
| +20° C. | 3.56 | 412.8 |
| −55° C. | 3.51 | 411.6 |
| −78° C. | 6.61 | 330.6 |

6.2 Example 2

Figure 3:
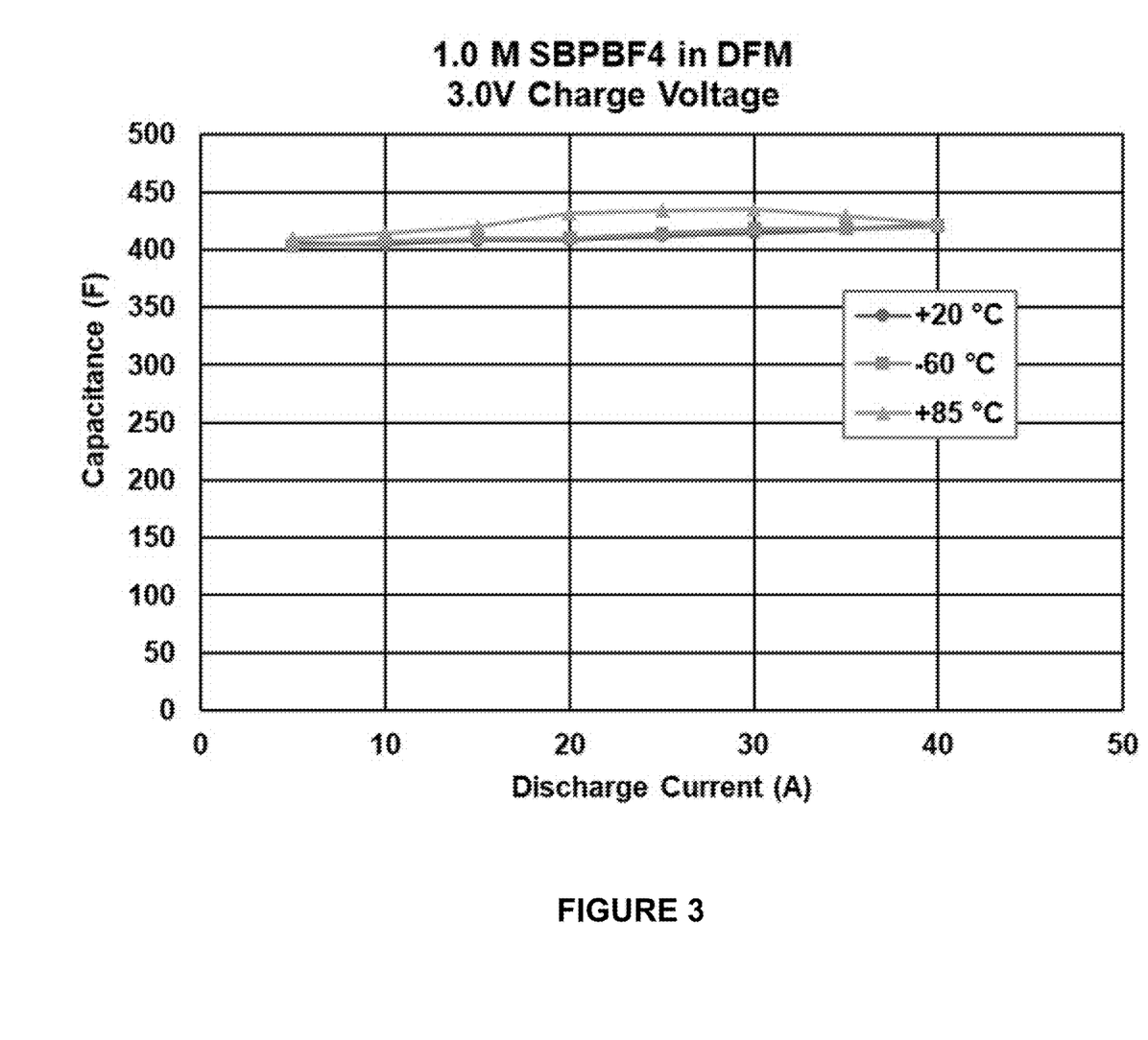
FIG. 3 illustrates the capacitance vs. discharge rate for an electrochemical device composed of 1.0 M SBPBF4 in difluoromethane at various temperatures.

An electrochemical capacitor device was tested with a liquefied gas electrolyte composed of 1.0 M SBPBF4 in difluoromethane (DFM). The device was tested at various discharge rates up to 40 Amp at −60, +20, and +85° C. There is no appreciable change in capacitance over the currents tested at each temperature, indicating high performance at each temperature. The capacitance vs. temperature data at each temperature are plotted in FIG. 3.

6.3 Example 3

Figure 4:
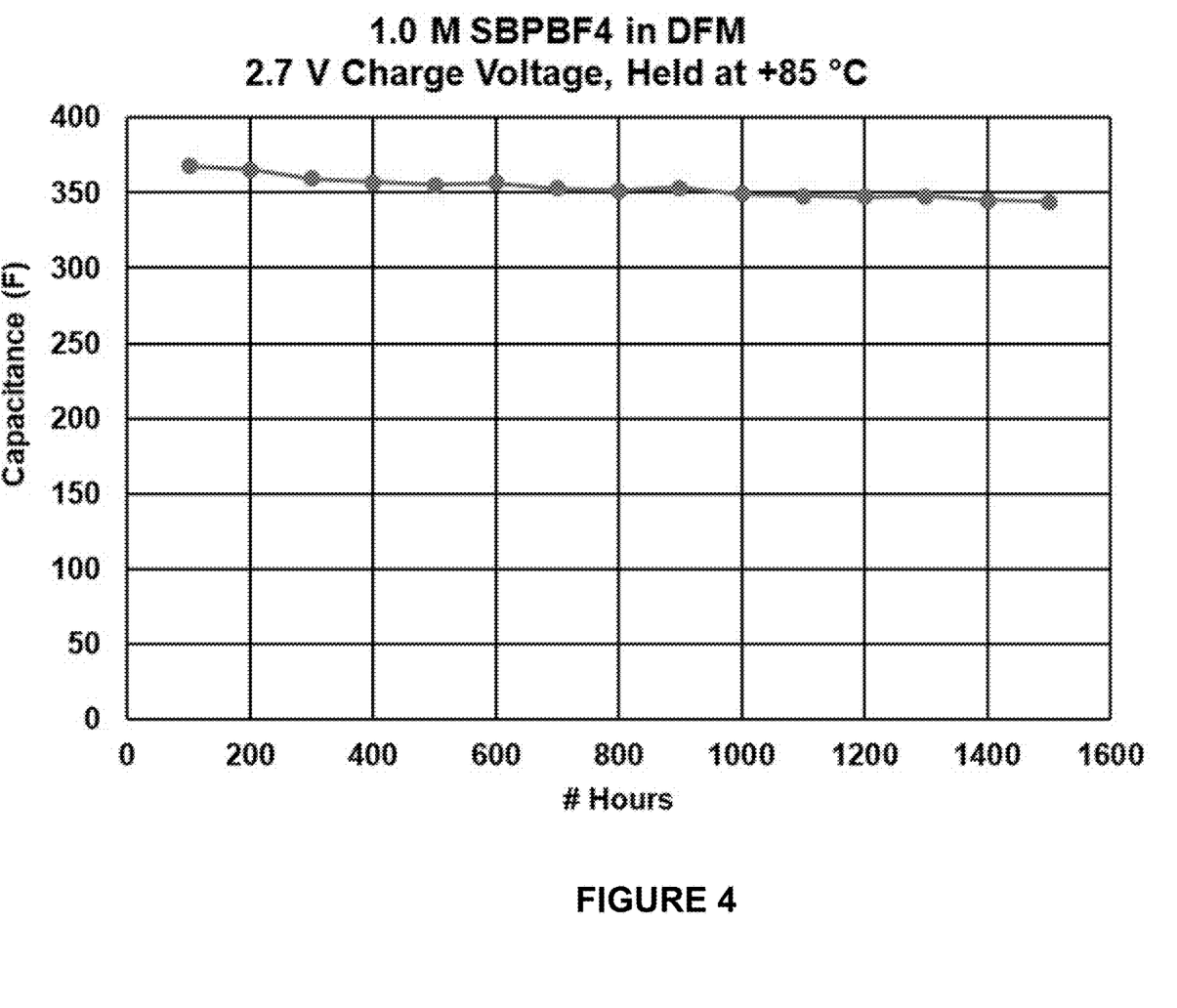
FIG. 4 illustrates the capacitance vs. time for an electrochemical device composed of 1.0 M SBPBF4 in difluoromethane, which was held at 2.7 V at +85° C. for 1500 hrs.
Figure 5:
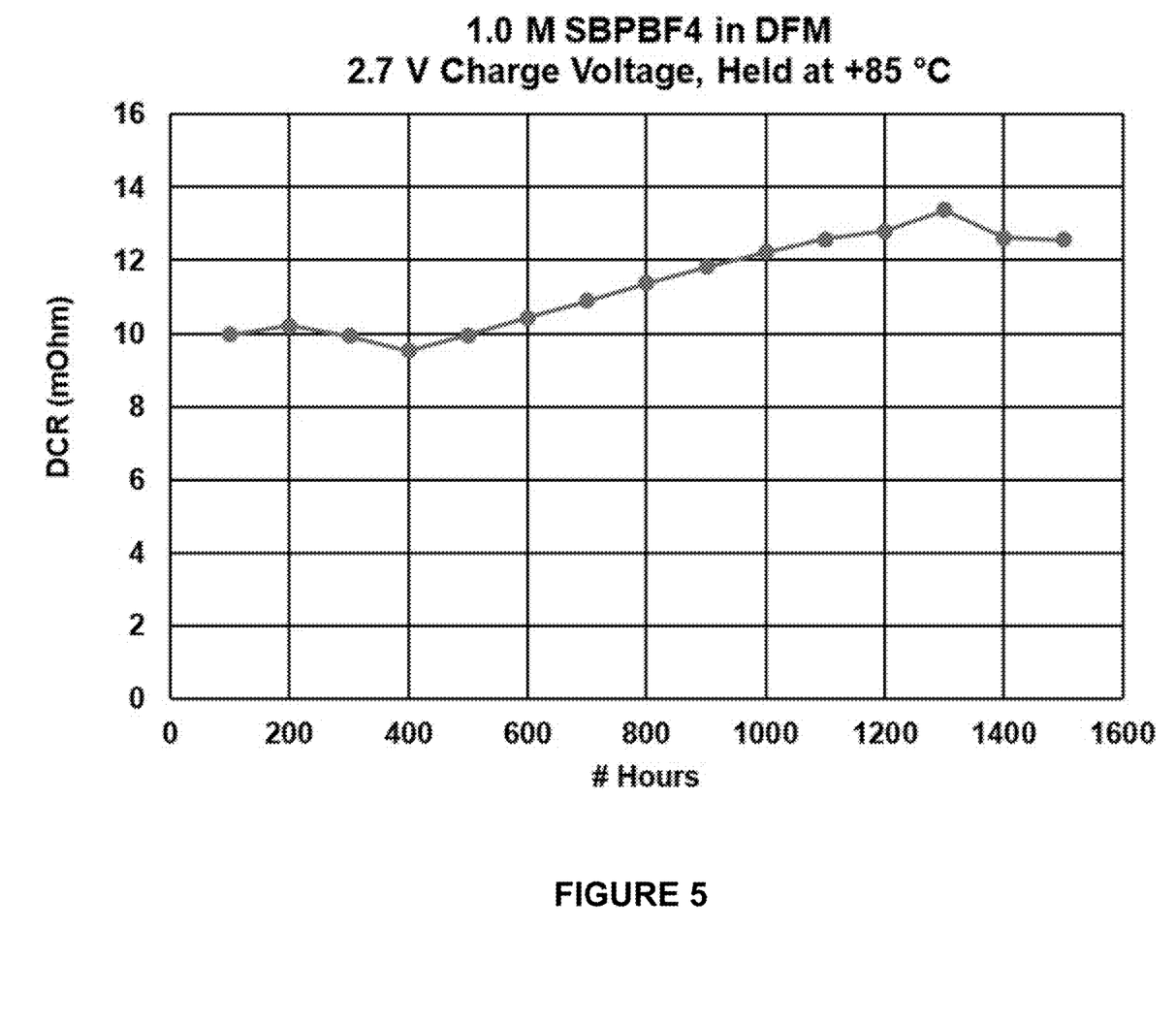
FIG. 5 illustrates the DCR resistance vs. time for an electrochemical device composed of 1.0 M SBPBF4 in difluoromethane, which was held at 2.7 V at +85° C. for 1500 hrs.

An electrochemical capacitor device was tested with a liquefied gas electrolyte composed of 1.0 M SBPBF4 in difluoromethane (DFM). The device was accelerated life tested at 2.7 V and at +85° C. The device was held at this temperature for the duration of the test and was discharged at 100-hour intervals to check its capacitance, followed immediately by charging back to 2.7 V. Capacitance and DCR vs. time data is shown in FIGS. 4 and 5, respectively. The capacitance of the tested device dropped ~7%, and DCR (resistance) rose ~26% over 1500 hours of testing. Generally, a cell passes this "DC Life" test with <20% drop in capacitance and <50% increase in DCR. This surprising result shows excellent stability of the SBPBF4 salt and difluoromethane liquefied gas solvent system. Never before has another electrolyte shown, at this combination of 2.7 V at +85° C., performance over 1500 hrs. It would not be obvious to those skilled in the art that the same salt used in other solvents (ex. acetonitrile) would perform so well in a new liquefied gas solvent, such as difluoromethane. It would require experiment testing to show this performance, and disclosed here for the first time, it is shown that this unique combination of salt and solvent enhances the device's performance significantly.

6.4 Example 4

Figure 6:
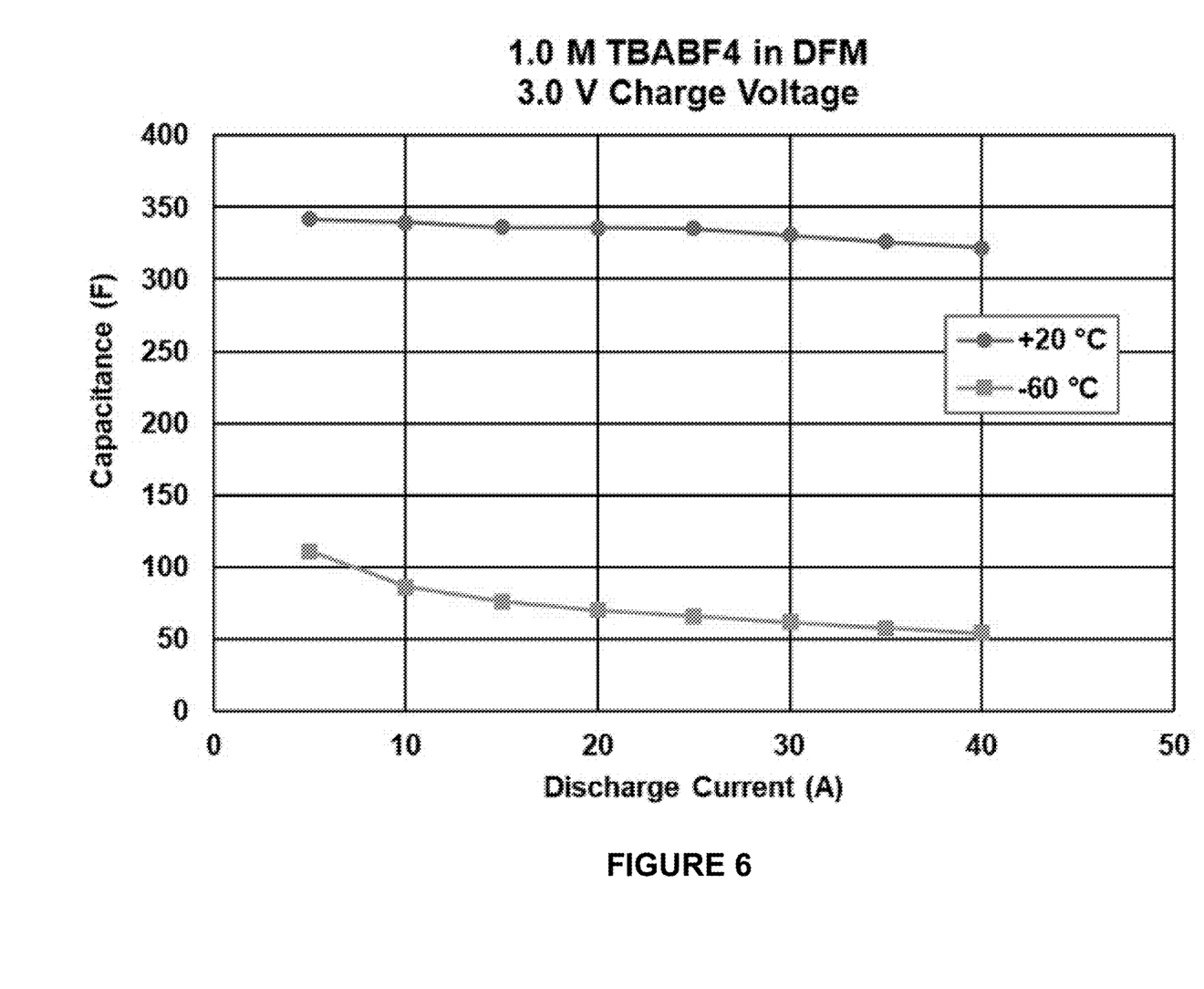
FIG. 6 illustrates the capacitance vs. discharge rate for an electrochemical device composed of 1.0 M TBABF4 in difluoromethane at various temperatures.

As a comparative test, an electrochemical capacitor device was tested with a liquefied gas electrolyte composed of 1.0 M TBABF4 in difluoromethane (DFM). The device was tested at various discharge rates up to 40 A at −60 and +20° C. While there is a 6% drop in capacitance from 5 A to 40 A discharge at +20° C., there is a significant drop in capacitance at lower temperatures. Capacitance vs. discharge current at each temperature is shown in FIG. 6. The cell performed very poorly with high DCR at a temperature of −60° C. This shows that it is neither the liquefied gas solvent difluoromethane nor the good solubility of the salt that is required for good low temperature performance, but also the correct combination of salt and solvent, as is the case with the disclosed SBPBF4 salt and difluoromethane solvent. Further, when compared to the performance shown in FIG. 3, the capacitance of the SBPBF4 salt vs. that of the TBABF4 salt is higher. This is because the small size of the cation is able to access more nanopores on the carbon electrode, increasing the device capacitance. These different metrics would not obvious unless experimentation was conducted to determine actual cell performance.

6.5 Example 5

Figure 7:
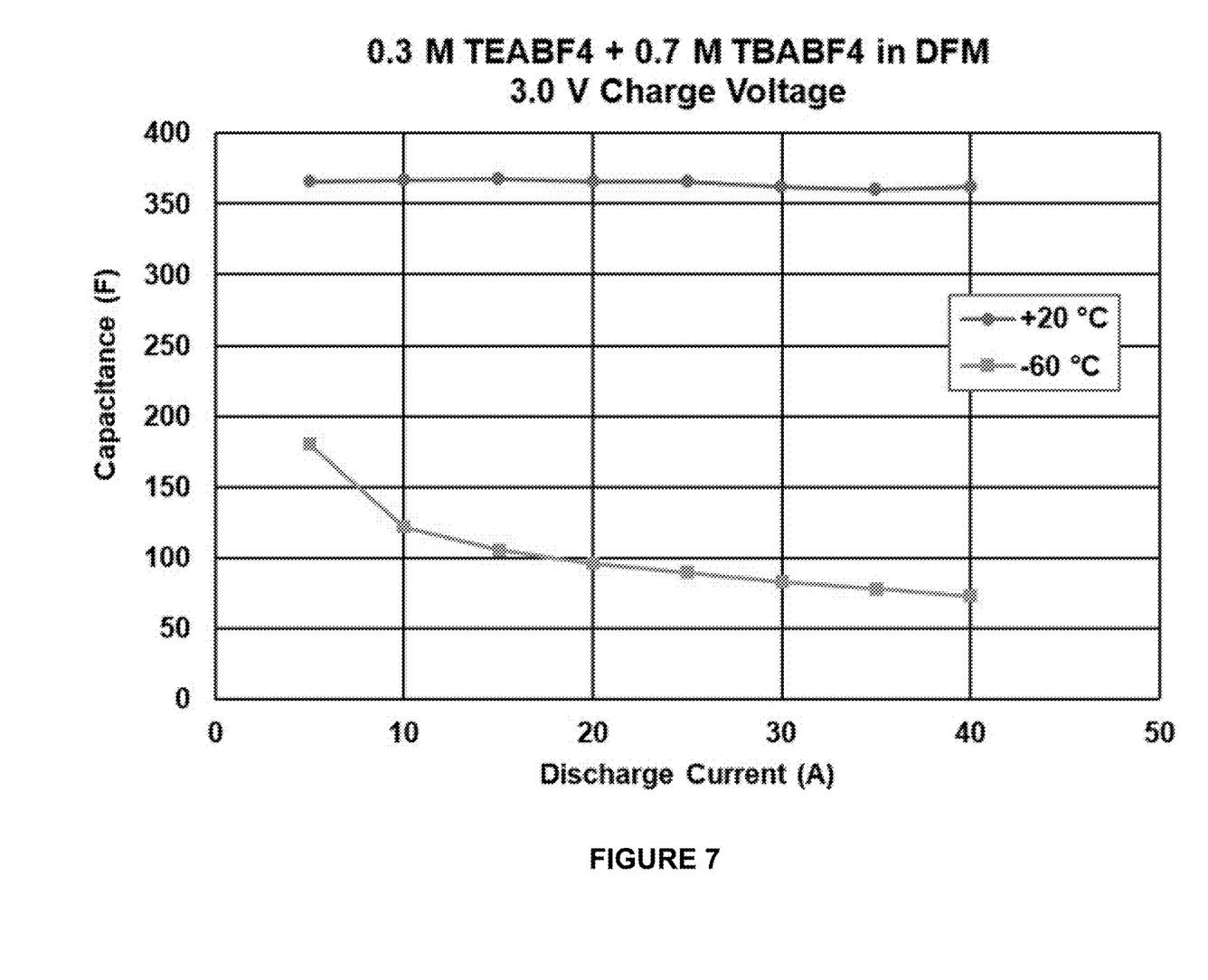
FIG. 7 illustrates the capacitance vs. discharge rate for an electrochemical device composed of 0.3 M TEABF4 and 0.7 M TBABF4 in difluoromethane at various temperatures.

As a comparative test, an electrochemical capacitor device was tested with a liquefied gas electrolyte composed of 0.3 TEABF4 and 0.7 M TBABF4 in difluoromethane (DFM). The device was tested at various discharge rates up to 40 A at −60 and +20° C. While there is little to no drop in capacitance from 5 A to 40 A discharge at +20° C., there is a significant drop in capacitance at lower temperatures. Capacitance vs. discharge current at each temperature is shown in FIG. 7. The cell performed very poorly with high DCR at a temperature of +85° C.

6.6 Example 6

Figure 8:
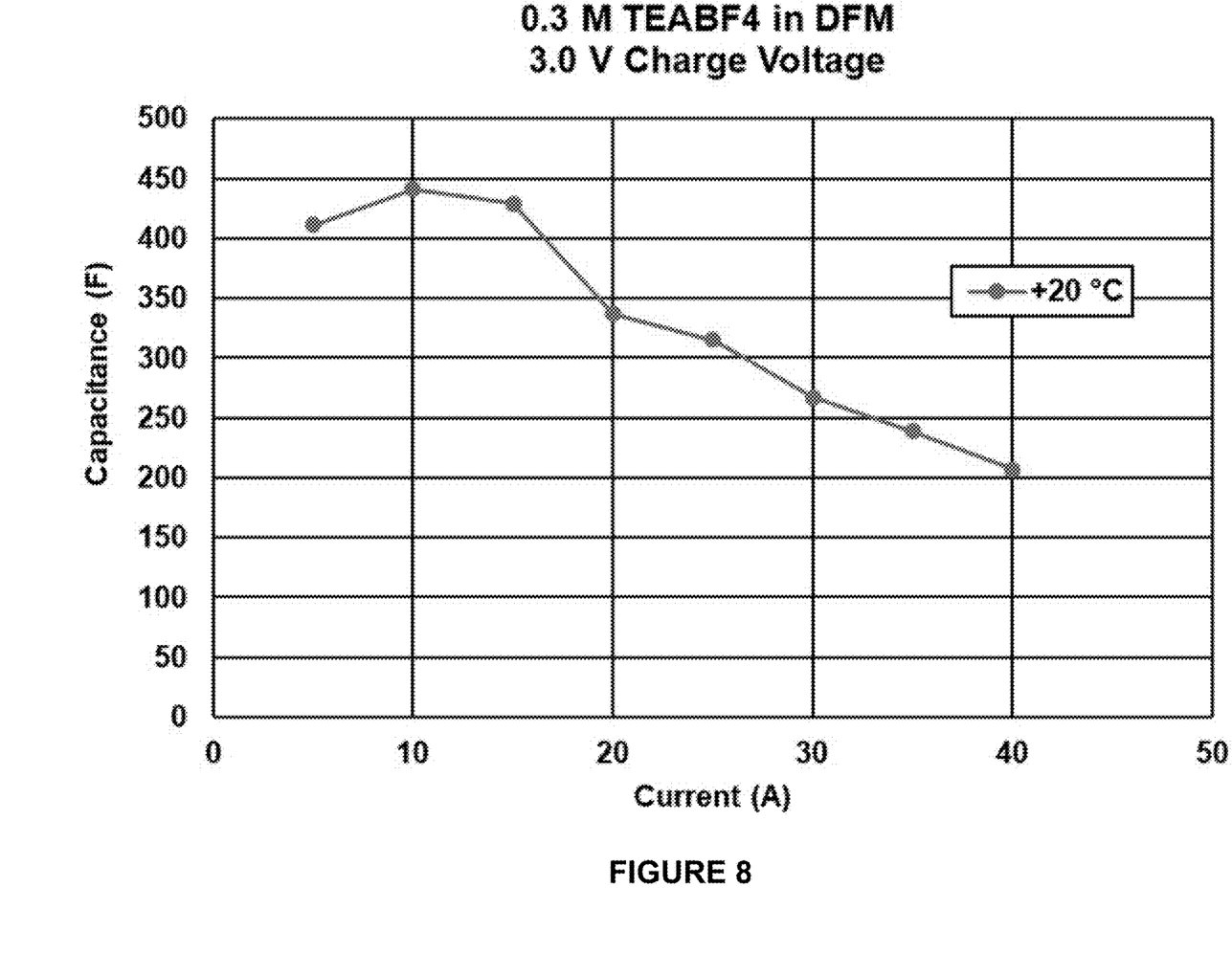
FIG. 8 illustrates the capacitance vs. discharge rate for an electrochemical device composed of 0.3 M TEABF4 in difluoromethane at +20° C.

As a comparative test, an electrochemical capacitor device was tested with a liquefied gas electrolyte composed of 0.3 TEABF4 in difluoromethane (DFM). The device was tested at various discharge rates up to 40 A at +20° C. There is a significant drop in capacitance at increased levels of the discharge current. Capacitance vs. discharge current is shown in FIG. 8. The cell performed very poorly with high DCR at extreme temperatures of −60° C. and +85° C.

6.7 Example 7

As a comparative test, several electrochemical capacitor devices were tested with a liquefied gas electrolyte composed of 1.0 M SBPBF4 in DFM, 1.0M TBABF4 in DFM, 0.3 TEABF4+0.7M TBABF4 in DFM and 0.3M TEABF4 in difluoromethane (DFM). The DCR resistance was measured for each cell. The results of the test are shown in Table 2 below. Clearly, the cell with SBPBF4 salt in DFM had the lowest resistance of the cells tested at both +20 and −60° C.

TABLE 2

| | DCR (mΩ) | |
| --- | --- | --- |
| | +20° C. | −60° C. |
| 1.0M SBPBF4 in DFM | 3.56 | 3.51 |
| 1.0M TBABF4 in DFM | 4.54 | 6.6 |
| 0.3M TEABF4 + 0.7M TBABF4 in DFM | 3.7 | 7.4 |
| 0.3M TEABF4 in DFM | 40 | — |

Although exemplary embodiments and applications of the invention have been described herein, including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. An electrochemical capacitor device, comprising:
   an ionically conducting electrolyte comprising a mixture of a compressed gas solvent and a solid salt,
      wherein the compressed gas solvent is difluoromethane with a vapor pressure above 100 kPa at a room temperature of 293.15 K; and
      wherein the salt is spiro-(1,1')-bipyrrolidinium tetrafluoroborate;
   a housing enclosing the ionically conducting electrolyte under a pressurized condition to maintain the compressed gas solvent at a pressure higher than 100 kPa at a room temperature of 293.15 K; and
   at least two conducting electrodes in contact with the ionically conducting electrolyte;
      wherein the salt has a solubility in the compressed gas solvent of 1M or more at a temperature of +85 C.

2. The electrochemical capacitor of claim 1, wherein one or both electrodes are composed of a carbon material selected from the group consisting of: activated carbon, graphite, carbon black, graphene, and carbon nanotubes.

\* \* \* \* \*